United States Patent
Andrzejewski

(10) Patent No.: US 11,680,610 B2
(45) Date of Patent: Jun. 20, 2023

(54) CLUTCH ASSEMBLY HAVING NORMALLY ON STRUT CONFIGURED TO PREVENT SHOCK LOAD DEPLOYMENT

(71) Applicant: Means Industries, Inc., Saginaw, MI (US)

(72) Inventor: Todd M. Andrzejewski, Saginaw, MI (US)

(73) Assignee: MEANS INDUSTRIES, INC., Saginaw, MI (US)

(*) Notice: Subject to any disclaimer, the term of this patent is extended or adjusted under 35 U.S.C. 154(b) by 0 days.

(21) Appl. No.: 17/577,859

(22) Filed: Jan. 18, 2022

(65) Prior Publication Data

US 2022/0252112 A1   Aug. 11, 2022

Related U.S. Application Data

(60) Provisional application No. 63/148,193, filed on Feb. 11, 2021.

(51) Int. Cl.
*F16D 41/12*   (2006.01)
*F16D 27/10*   (2006.01)

(52) U.S. Cl.
CPC ........... *F16D 41/125* (2013.01); *F16D 27/10* (2013.01)

(58) Field of Classification Search
None
See application file for complete search history.

(56) References Cited

U.S. PATENT DOCUMENTS

| | | | |
|---|---|---|---|
| 9,127,724 B2 | 9/2015 | Kimes et al. | |
| 9,638,266 B2 | 5/2017 | Kimes | |
| 2016/0375754 A1 | 12/2016 | Kurosaki et al. | |
| 2017/0002877 A1* | 1/2017 | Shioiri | F16D 41/125 |
| 2017/0097055 A1* | 4/2017 | Shibata | B60K 6/442 |
| 2018/0087585 A1 | 3/2018 | Hand et al. | |
| 2018/0266503 A1* | 9/2018 | Shioiri | F16D 41/14 |
| 2018/0328419 A1* | 11/2018 | Hand | F16D 41/14 |
| 2019/0293131 A1* | 9/2019 | Campton | F16D 41/12 |
| 2022/0235831 A1 | 7/2022 | Andrzejewski et al. | |

* cited by examiner

*Primary Examiner* — Timothy Hannon
(74) *Attorney, Agent, or Firm* — Reising Ethington P.C.

(57) ABSTRACT

A clutch assembly that includes an actuator, an apply spring, a pocket plate, which has a pocket, and a strut (e.g., a teeter-totter strut) retained in the pocket, is provided. The apply spring continually acts on the strut for the strut to be in an engaged position. The strut, in response to the actuator additionally acting on the strut, pivots from the engaged position to a disengaged position. The clutch assembly is configured to prevent unintended deployment of the strut due to shock load so that, when the strut is in the disengaged position due to the actuator additionally acting on the strut, the clutch assembly prevents the shock load from causing the strut to pivot from the disengaged position to the engaged position.

16 Claims, 9 Drawing Sheets

CLUTCH ASSEMBLY HAVING NORMALLY ON STRUT CONFIGURED TO PREVENT SHOCK LOAD DEPLOYMENT

TECHNICAL FIELD

The present disclosure relates generally to clutch assemblies and, more specifically, to clutch assembly struts.

BACKGROUND

Unintended deployment of a locking member, such as a strut, of a clutch assembly involves the strut unintentionally moving from a non-deployed (i.e., disengaged, uncoupled, or "OFF") position to a deployed (i.e., engaged, coupled, or "ON") position. Unintended deployment of the strut (i.e., the strut unintentionally moving from the disengaged position to the engaged position) due to shock load is problematic.

Typically, the strut is normally OFF (i.e., biased to be in the disengaged position). In certain scenarios it may be desirable for the strut to be normally ON (i.e., biased to be in the engaged position). Considerations of G-load exist while a normally ON strut is turned OFF (e.g., while a strut, biased by an apply spring to be in the engaged position, is in the disengaged position due to being additionally acted upon by an actuator in a manner overcoming the biasing).

SUMMARY

According to one embodiment, a clutch assembly that includes an actuator, an apply spring, a pocket plate, which has a pocket, and a strut (e.g., a teeter-totter strut) retained in the pocket, is provided. The apply spring which continually acts on the strut for the strut to be in an engaged position. The strut, in response to the actuator additionally acting on the strut, pivots from the engaged position to a disengaged position. The clutch assembly is configured to prevent unintended deployment of the strut due to shock load so that, when the strut is in the disengaged position due to the actuator additionally acting on the strut, the clutch assembly prevents the shock load from causing the strut to pivot from the disengaged position to the engaged position.

According to another embodiment, a clutch assembly comprising that includes an actuator, an apply spring, a pocket plate, which has a pocket, and a strut retained in the pocket, is provided. The apply spring continually acts on the strut for the strut to be in an engaged position. The strut in response to the actuator additionally acting on the strut pivots from the engaged position to a disengaged position. The clutch assembly includes at least one of the following: (i) a pivot point of the strut that is located between a front side of the strut and a center of mass (CoM) of the strut, or (ii) a pivot point of the strut that is located between a rear side of the strut and a center of mass (CoM) of the strut, so that when the strut is in the disengaged position due to the actuator additionally acting on the strut, unintended shock load is prevented from causing the strut to pivot from the disengaged position to the engaged position.

According to embodiments, the strut has enhanced features for preventing unintended deployment of the strut due to shock load. As such, when the strut is in the disengaged position due to the actuator additionally acting on the strut, the enhanced features of the strut prevent the shock load from causing the strut to pivot from the disengaged position to the engaged position. Enhanced strut features in accordance with embodiments of the present disclosure include utilization of strut center of mass (CoM) to prevent unintended engagement of a normally ON strut when the strut is in the controlled OFF position. The CoM of the strut may be positioned between the return actuator (e.g., plunger) or rear side of the strut and the ears of the strut, but in front of (towards a front side of the strut) a pivot point that occurs between the strut and a mating member, such as a surface within the pocket of the pocket plate. Due to the positioning of the CoM during an impact load parallel to the direction of strut engagement, the tendency for the strut will be to move away from engagement. This prevents an additional G-load on an armature for the actuator from the strut. Thus, the strut design coupled with a latching armature prevents unintended strut engagement.

In accordance with at least some embodiments of the present disclosure, a clutch assembly or electromechanical apparatus (e.g., "selectable solenoid insert" or "single strut insert" ("SSI") discussed below) is designed such that an apply spring of the SSI is placed under the tip of the strut thereby causing the strut to be in the normally engaged position. To retract the strut, a controllable plunger of the SSI acts on the rear of the strut causing the engagement of the face of the strut to move to the disengaged position. When the strut is held in the disengaged position by the plunger, the CoM of the strut is placed such that during a shock load event which is in parallel to the engagement motion, the strut will tip down and away from the engagement face. This motion prevents additional loads from being induced on the plunger from the strut. The prevention of additional forces on the latching solenoid of the SSI leads to reduced latching forces needed and reduced force to disengage the strut.

At least some embodiments of the present disclosure provide for utilizing a normally ON SSI/clutch with G-load prevention. Conventional assemblies do not address the use of normally ON struts with controlled OFF positions. This along to the addition of the shock-load deployment lend itself to being used in automotive drivetrains and braking systems.

BRIEF DESCRIPTION OF THE DRAWINGS

FIG. 12A illustrates a cross-sectional view of the electromechanical apparatus subassembly with the strut being in the engaged position due to biasing from an apply spring of the electromechanical apparatus subassembly whereby the strut is normally ON;

DETAILED DESCRIPTION

Figure 1:
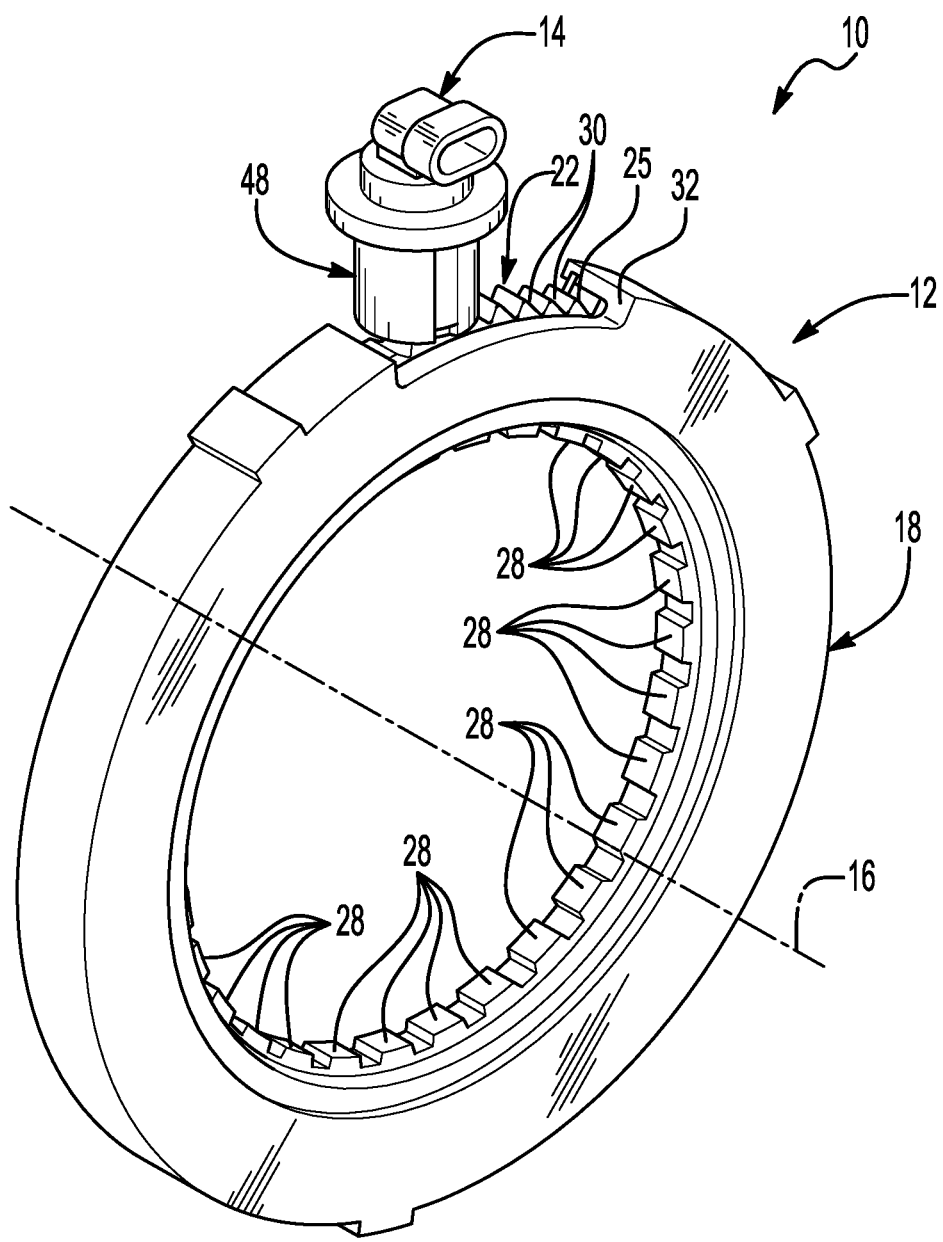
FIG. 1 illustrates a schematic, perspective view of an illustrative radial/planar clutch system having a controllable coupling assembly and an electromechanical apparatus.
Figure 2:
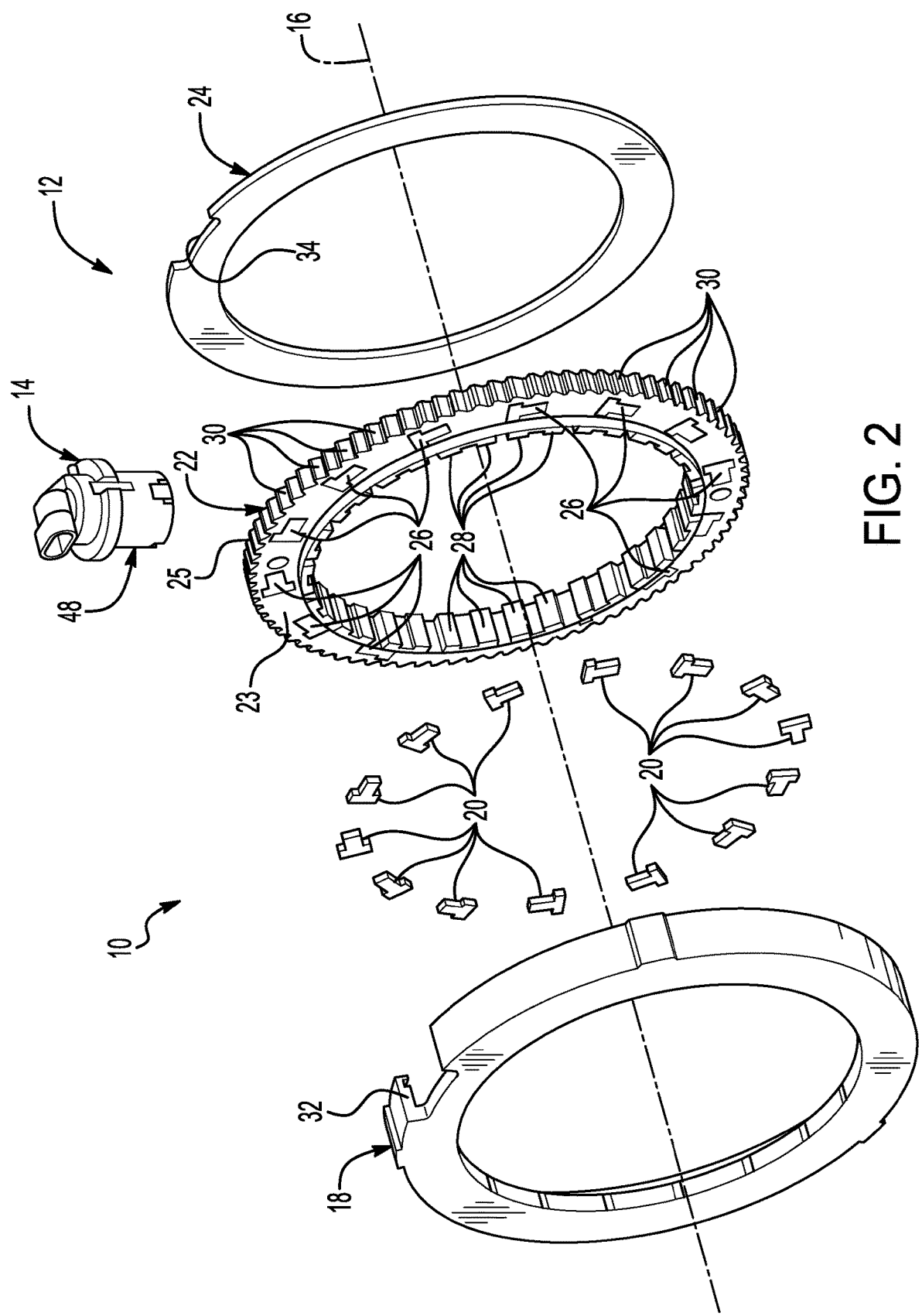
FIG. 2 is an exploded, perspective view of the controllable coupling assembly and the electromechanical apparatus of the radial/planar clutch system.

Detailed embodiments of the present disclosure are disclosed herein; however, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring now to FIGS. 1, 2, 3, and 4, various views of an illustrative radial/planar clutch system 10 are shown. The radial/planar clutch system 10 includes a controllable coupling assembly 12. The controllable coupling assembly 12 includes a first coupling member 18 and a second coupling member 22. The coupling members 18, 22 are mounted for rotation relative to one another about a rotational axis 16. The first coupling member 18 has a coupling face 19 (FIG. 3) oriented to face axially in a first direction with respect to the rotational axis 16. The second coupling member 22 has an axial coupling face 23 (FIG. 2) oriented to face axially in an opposite second direction with respect to the rotational axis 16 and a radial coupling face 25 oriented to face radially with respect to the rotational axis 16.

Figure 4:
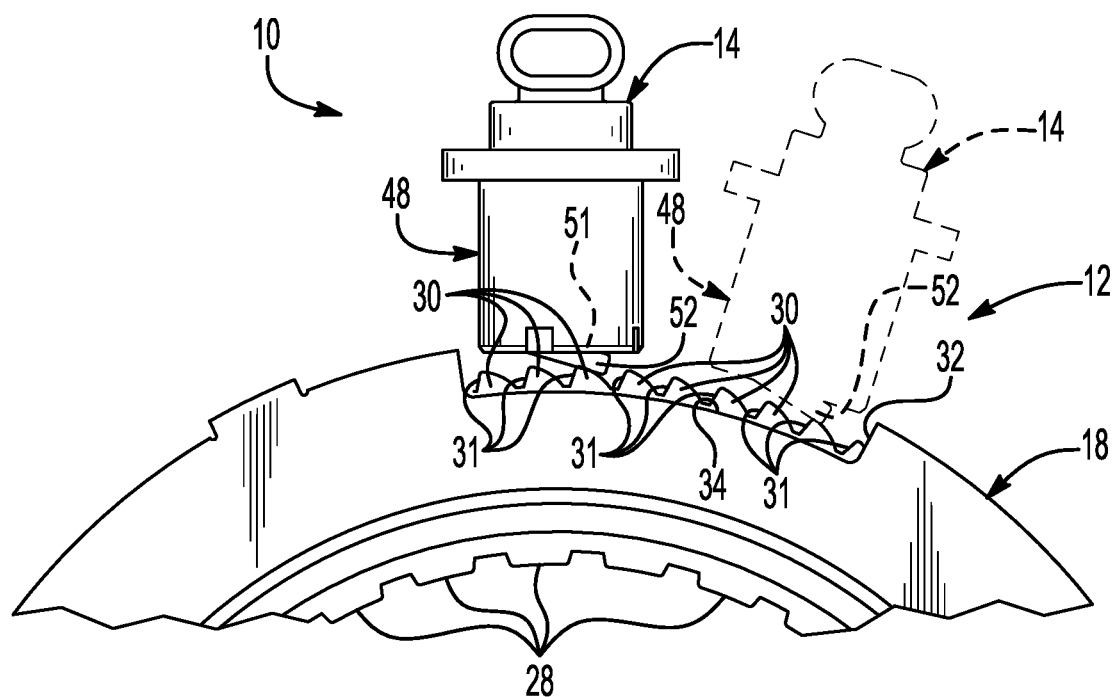
FIG. 4 is an enlarged side view, partially broken away, of the controllable coupling assembly and the electromechanical apparatus of the radial/planar clutch system together with a second electromechanical apparatus in phantom with locking elements of the electromechanical apparatuses partially extended towards locking formations of a coupling member of the controllable coupling assembly.

The axial coupling face 23 of the second coupling member 22 has angularly spaced pockets 26 formed thereon. The radial coupling face 25 of the second coupling member 22 has reverse locking formations (notches or teeth) 30 formed thereon. Each notch 30 defines a load-bearing shoulder 31 (FIG. 4).

The second coupling member 22 has a set of splines 28 formed on its inner diameter for drivingly engaging a drive or driven member (not shown) for rotation about the rotational axis 16.

The controllable coupling assembly 12 further includes a set of forward locking elements (locking members or struts) 20. The forward struts 20 are received within the pockets 26 of the axial coupling face 23 of the second coupling member 22.

Figure 3:
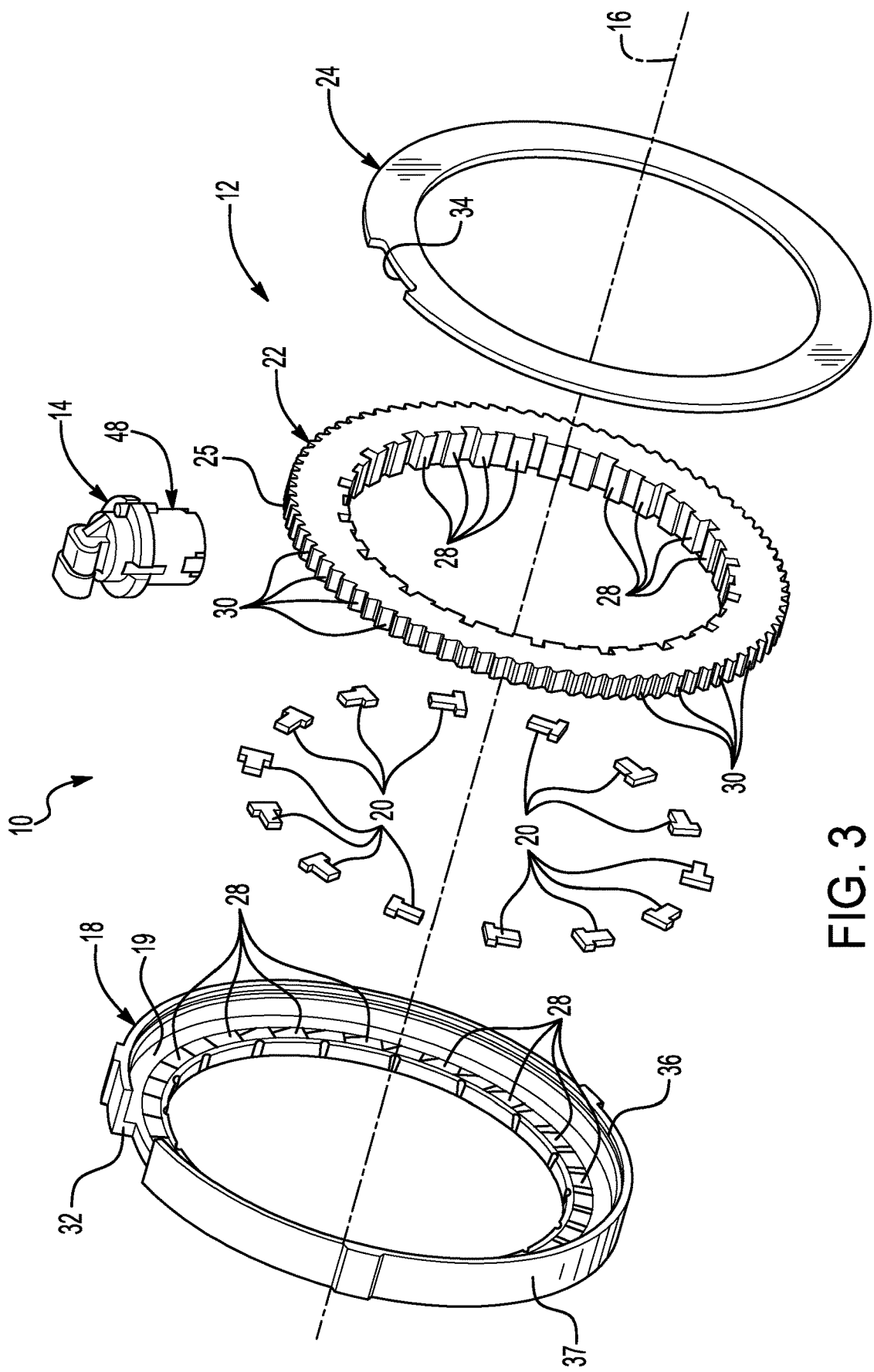
FIG. 3 is an exploded, perspective view of the controllable coupling assembly and the electromechanical apparatus of the radial/planar clutch system from another angle.

With respect to FIG. 3, the controllable coupling assembly 12 further includes a locking ring 24, which is shaped as an annular plate. The locking ring 24 is inserted into an annular groove 36 of an axially extending wall 37 of the first coupling member 18 to hold the coupling members 18, 22 together. The locking ring 24 has a circumferential cutout 34 which aligns with a circumferential cutout 32 in the axially extending wall 37 of the first coupling member 18 when the locking ring 24 is inserted into the annular groove 36 of the first coupling member 18.

The radial/planar clutch system 10 further includes an electromechanical apparatus 14. The electromechanical apparatus 14 may be referred to herein as a "selectable solenoid insert" or "single strut insert" ("SSI"). The SSI 14 is fixed in position. For example, the SSI 14 is fastened to a transmission case (not shown).

With respect to FIG. 4, the SSI 14 includes a housing 48. The housing 48 has a pocket 51 (FIG. 4). The pocket 51 defines a load-bearing shoulder. The SSI 14 further includes a reverse locking element (locking member or strut) 52. The reverse strut 52 has a teeter-totter design. The reverse strut 52 is received within the pocket 51 of the SSI housing 48. The reverse strut 52 is movable between (i) a deployed position (i.e., engaged position, coupling position, or "ON") in which an engagement face of the reverse strut 52 extends out of the SSI housing 48 and engages a notch 30 of the radial coupling face 25 of the second coupling member 22 and (ii) a non-deployed position (i.e., disengaged position, uncoupling position, or "OFF") in which the reverse strut 52 is fully contained within the SSI housing 48 and thereby is disengaged from the notches 30. The deployed position is characterized by abutting engagement of the reverse strut 52 with the load-bearing shoulder 31 of a notch 30 and the load-bearing shoulder of pocket 51. The reverse strut 52 in the deployed position thereby prevents the second coupling member 22 from rotating in one direction about the rotational axis 16, wherein the second coupling member 22 remains freely rotatable in the other direction about the rotational axis 16.

The SSI 14 further includes an apply spring (shown in FIGS. 12A, 12B, 12C, and 12D as apply spring 270). The apply spring is arranged in the pocket 51 of the SSI housing 48. The apply spring is configured to continually act on the reverse strut 52 to bias the reverse strut 52 to the deployed position. As such, the reverse strut 52 is normally ON.

The SSI 14 further includes a solenoid and an actuator. The solenoid and the actuator are contained within the SSI housing 48. The solenoid includes an armature and an excitation coil. The actuator is a controllable reciprocating plunger. The plunger extends through an internal aperture of the SSI housing 48 and into the pocket 51 of the SSI housing 48.

The excitation coil when energized causes the actuator to linearly move from (i) a non-actuated position (shown in FIG. 12A) in which the actuator is removed from contact with the reverse strut 52 to (ii) an actuated position (shown in FIGS. 12B, 12C, and 12D) in which the actuator contacts with and acts on the reverse strut 52. The actuator in the actuated position overcomes the biasing action of the apply spring and causes the reverse strut 52 to be in the non-deployed position. As such, the reserve strut 52 is OFF in response to the actuator additionally acting on the reverse strut 52.

Figure 12A:
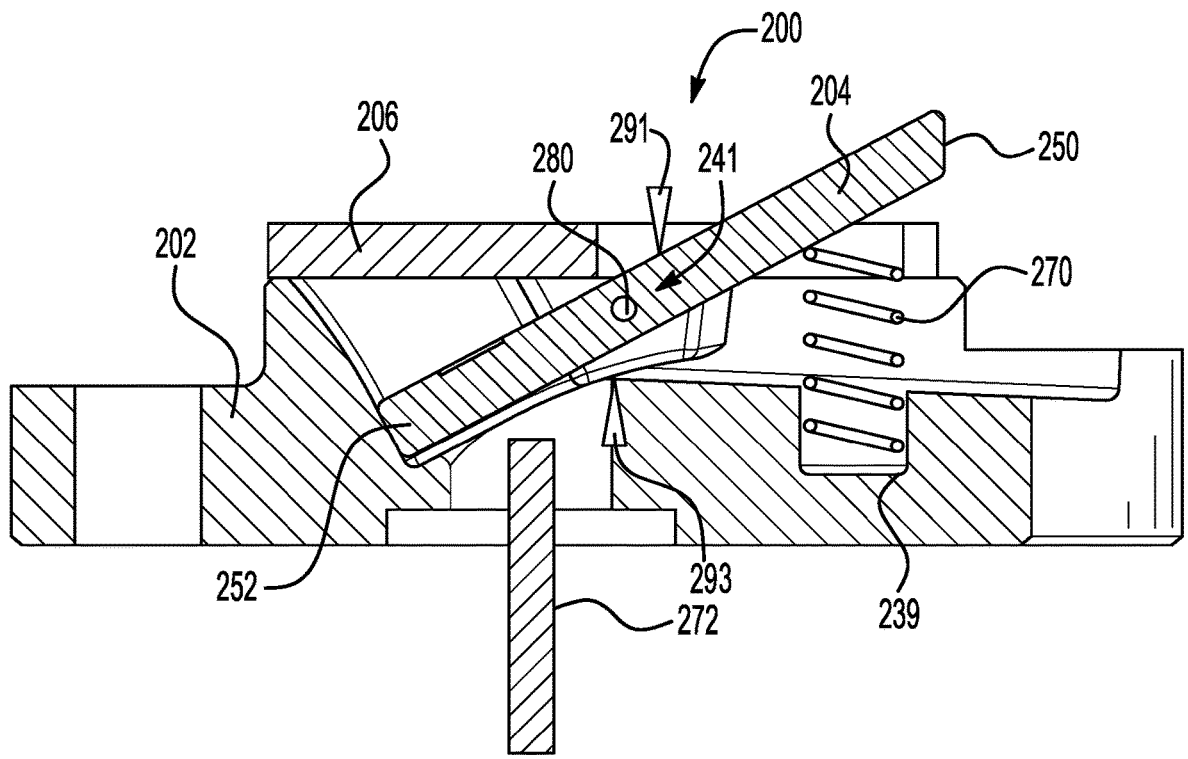

When the excitation coil is de-energized, the actuator is in the non-actuated position (shown in FIG. 12A). Consequently, the reverse strut 52 moves to or remains in the deployed position as the biasing action of the apply spring acts on the reverse strut 52 without any counterforce from the actuator. As such, as indicated above, the reverse strut 52 is normally ON.

The reverse strut 52 has enhanced features (described with reference to FIGS. 12A, 12B, 12C, and 12D) for preventing unintended deployment of the reverse strut 52 due to shock load. As such, when the reverse strut 52 is in the disengaged position in response to the actuator additionally acting on the reverse strut 52, the enhanced features of the reverse strut 52 prevent shock load from causing the reverse strut 52 to pivot from the disengaged position to the engaged position.

Figure 5:
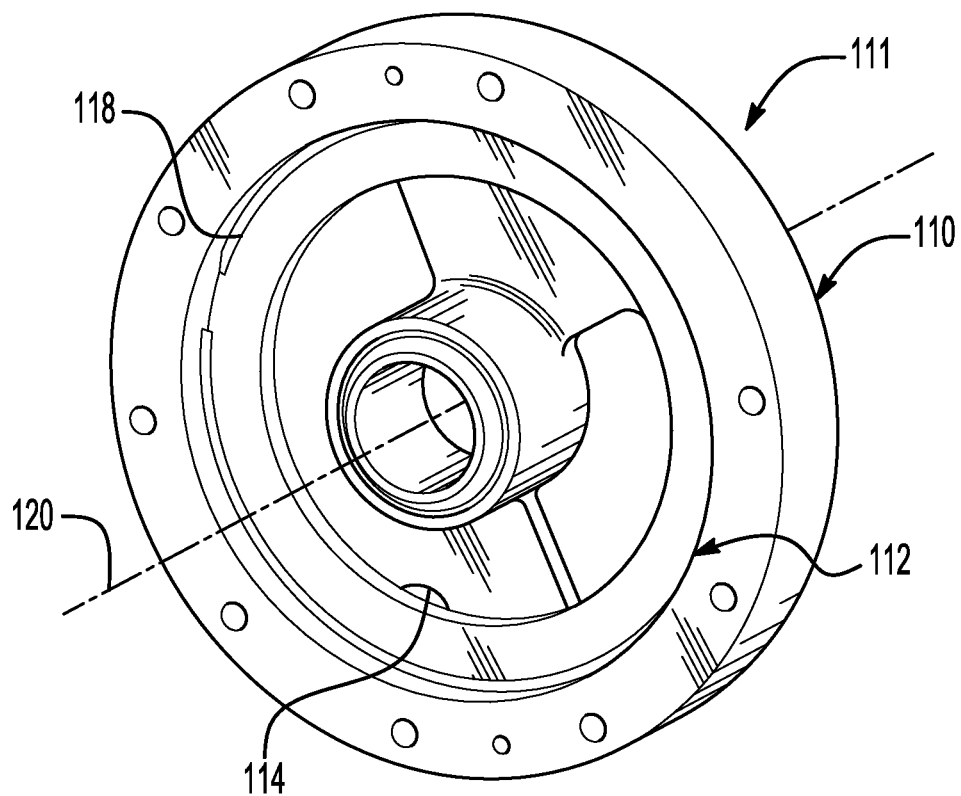
FIG. 5 illustrates a front perspective view of an illustrative planar clutch system having a controllable coupling assembly and an electromechanical apparatus.
Figure 6:
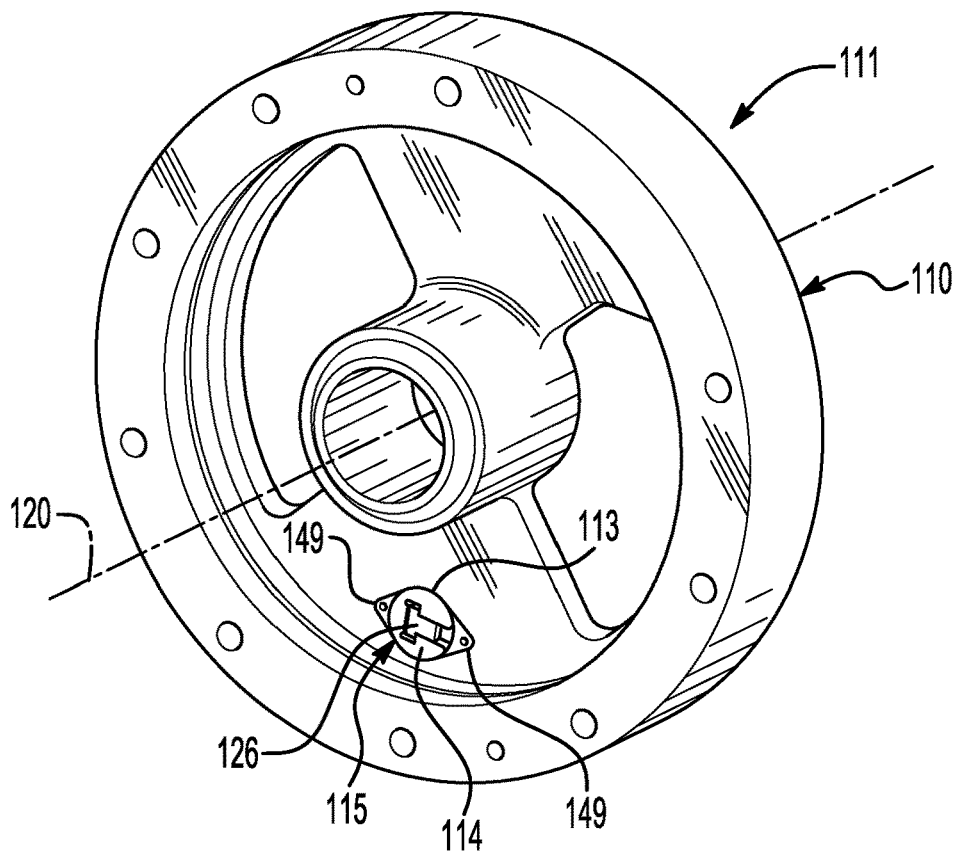
FIG. 6 is a front perspective view of the planar clutch system with a notch plate and a locking ring of the controllably coupling assembly removed to show the position of the electromechanical apparatus relative to a coupling member of the controllably coupling assembly which supports the electromechanical apparatus.
Figure 7:
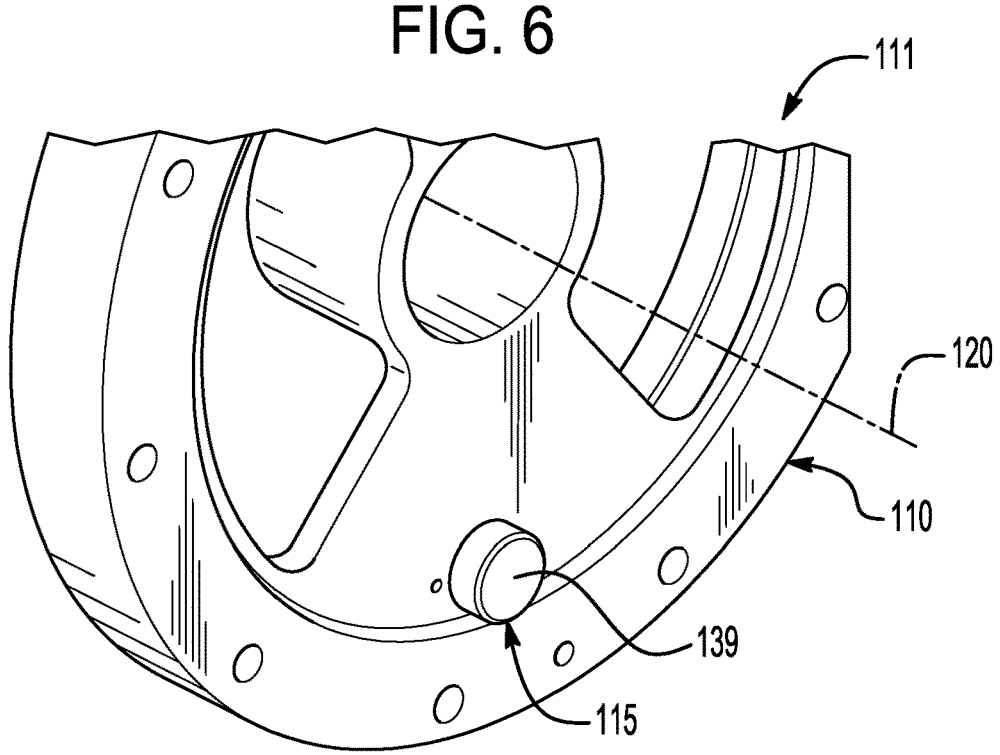
FIG. 7 is an enlarged rear perspective view, partially broken away, of (i) the coupling member which supports the electromechanical apparatus and (ii) the electromechanical apparatus.
Figure 8:
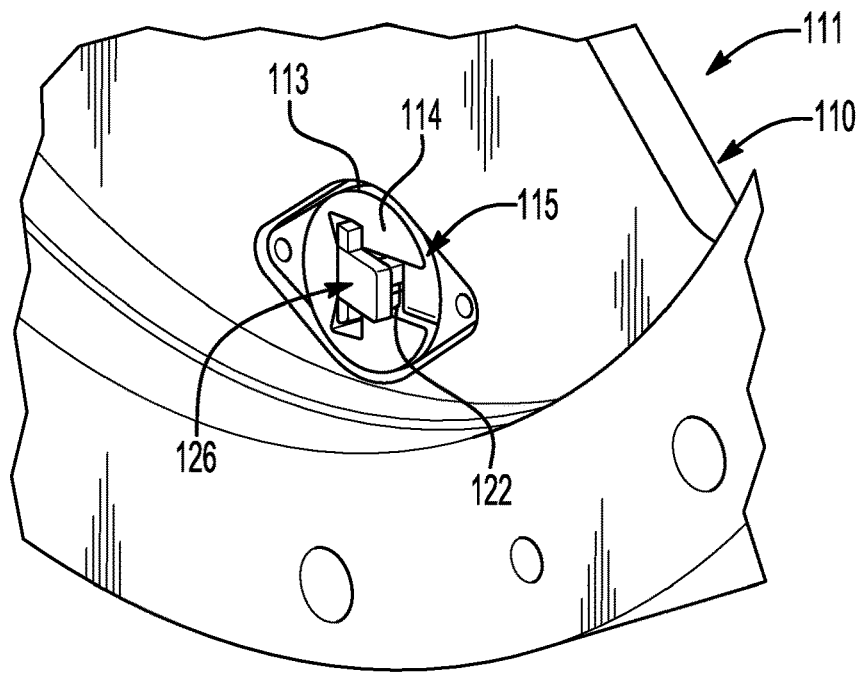
FIG. 8 is an enlarged front perspective view, partially broken away, of (i) the coupling member which supports the electromechanical apparatus and (ii) the electromechanical apparatus with the locking strut of the electromechanical apparatus being in a coupling position.

Referring now to FIGS. 5, 6, 7, and 8, various views of an illustrative planar clutch system 111. The planar clutch system 111 may be a ratcheting, one-way clutch assembly. The planar clutch system 111 includes a controllable coupling assembly having a first coupling member 110 (e.g., a pocket plate) and a second coupling member 112 (e.g., a notch plate) (FIG. 5). The coupling members 110, 112 are mounted for rotation relative to one another about a rotational axis 120.

The notch plate 112 has a coupling face oriented to face axially along a first direction with respect to the rotational axis 120. The coupling face of the notch plate 112 has a plurality of notches formed thereon (not shown). Each notch defines a load-bearing shoulder.

The planar clutch system 111 further includes an electromechanical apparatus 115 ("SSI 115"). The SSI 115 includes a housing 113 having an outer coupling face 114. The outer coupling face 114 of the housing 113 has a pocket 122 (FIG. 8) formed therein. The pocket 122 defines a load-bearing shoulder.

The coupling face of the notch plate 112 is in closed-spaced opposition with the outer coupling face 114 of the SSI housing 113 when the pocket plate 110 and the notch plate 112 are assembled and held together by a locking ring 118 as shown in FIG. 5.

The SSI 115 further includes a locking strut 126. The strut 126 has a teeter-totter design. The strut 126 is received within the pocket 122 of the SSI housing 113. The strut 126 is disposed between the outer coupling face 114 of the SSI housing 113 and the coupling face of the notch plate 112 when the pocket plate 110 and the notch plate 112 are assembled and held together.

The strut 126 is movable between (i) a deployed position (i.e., engaged position, coupling position, or "ON") (shown in FIG. 8) in which an engagement face of the strut 126 extends out of the SSI housing 113 and engages a notch of the notch plate 112 and (ii) a non-deployed position (i.e., disengaged position, uncoupling position, or "OFF") (shown in FIG. 6) in which the strut 126 is fully contained within the SSI housing 113 and thereby is disengaged from the notches of the notch plate 112. The deployed position is characterized by abutting engagement of the strut 126 with a load-bearing shoulder of the engaged notch of the notch plate 112 and the load-bearing shoulder of the pocket 122. The strut 126 in the deployed position thereby couples the pocket plate 110 and the notch plate 112 together whereby one-way torque transfer may occur between the pocket plate 110 and the notch plate 112.

The SSI 115 further includes an apply spring (shown in FIGS. 12A, 12B, 12C, and 12D as apply spring 270). The apply spring is arranged in the pocket 122 of the SSI housing 113. The apply spring is configured to continually act on the strut 126 to bias the strut 126 to the deployed position. As such, the strut 126 is normally ON.

The SSI 115 further includes a solenoid and an actuator (shown in FIGS. 12A, 12B, 12C, and 12D) contained within the SSI housing 113. The actuator, such as controllable reciprocating plunger, extends through an internal aperture of the SSI housing 113 and into the pocket 122 of the SSI housing 113. The solenoid is energized to linearly move the actuator from (i) a non-actuated position (shown in FIG. 12A) in which the actuator is removed from contact with the strut 126 to (ii) an actuated position (shown in FIGS. 12B, 12C, and 12D) in which the actuator contacts with and acts on the strut 126. The actuator in the actuated position overcomes the biasing action of the apply spring and causes the strut 126 to be in the non-deployed position. As such, the strut 126 is OFF in response to the actuator additionally acting on the strut 126.

When the solenoid is de-energized, the actuator linearly is in the non-actuated position (shown in FIG. 12A). Consequently, the strut 126 moves to or remains in the deployed position as the biasing action of the apply spring acts on the strut 126 without any counterforce from the actuator. As such, as indicated above, the strut 126 is normally ON.

The strut 126 has enhanced features (described with reference to FIGS. 12A, 12B, 12C, and 12D) for preventing unintended deployment of the strut 126 due to shock load. As such, when the strut 126 is in the disengaged position in response to the actuator additionally acting on the strut 126, the enhanced features of the strut 126 prevent shock load from causing the strut 126 to pivot from the disengaged position to the engaged position.

Figure 9:
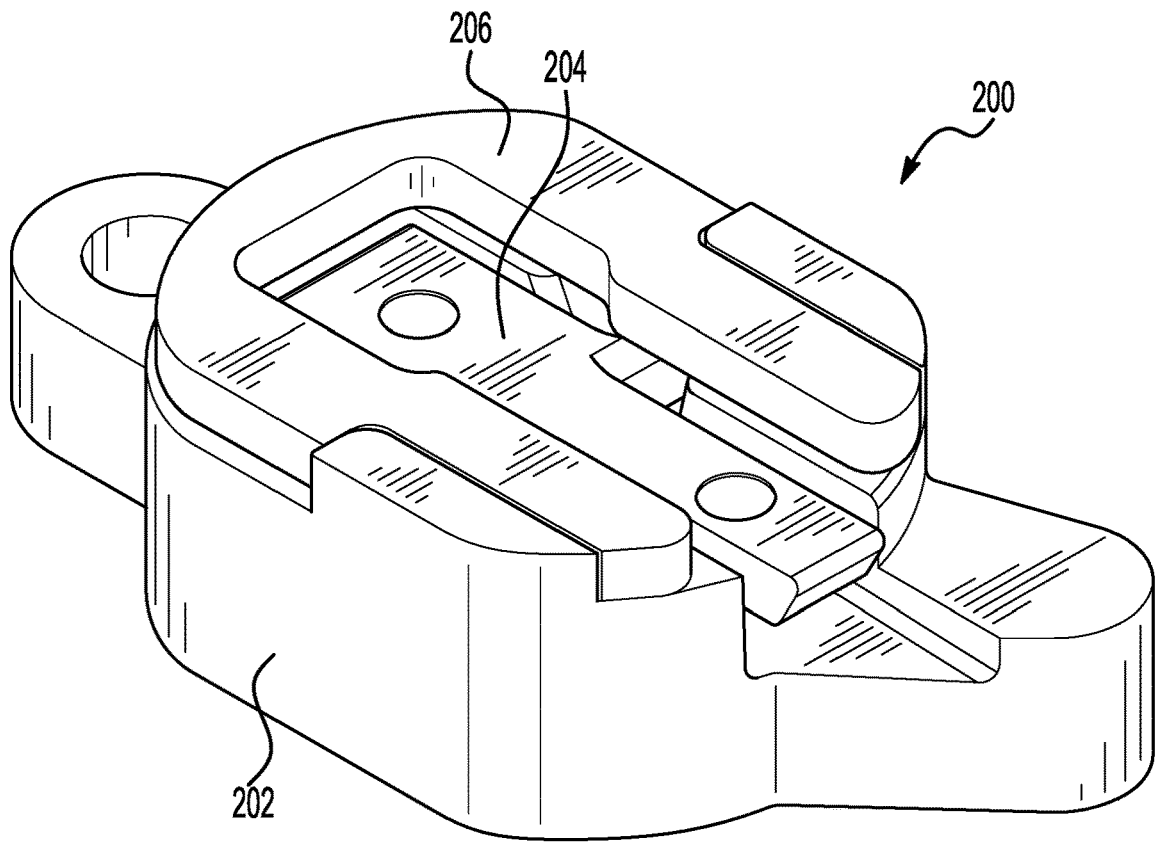
FIG. 9 illustrates a perspective view of an electromechanical apparatus subassembly including a pocket plate, a strut (in its disengaged position), and a cover plate.

Referring now to FIG. 9, a perspective view of an electromechanical apparatus subassembly 200 is shown. The electromechanical apparatus subassembly 200 may be part of a clutch or an SSI such as the SSI 14 or the SSI 115. The electromechanical apparatus subassembly 200 includes a pocket plate 202, a strut 204, and a cover plate 206. The strut 204 is representative of the strut 52 of the SSI 14 and the strut 126 of the SSI 115. The strut 204 is shown in FIG. 9 in its disengaged position.

Figure 10:
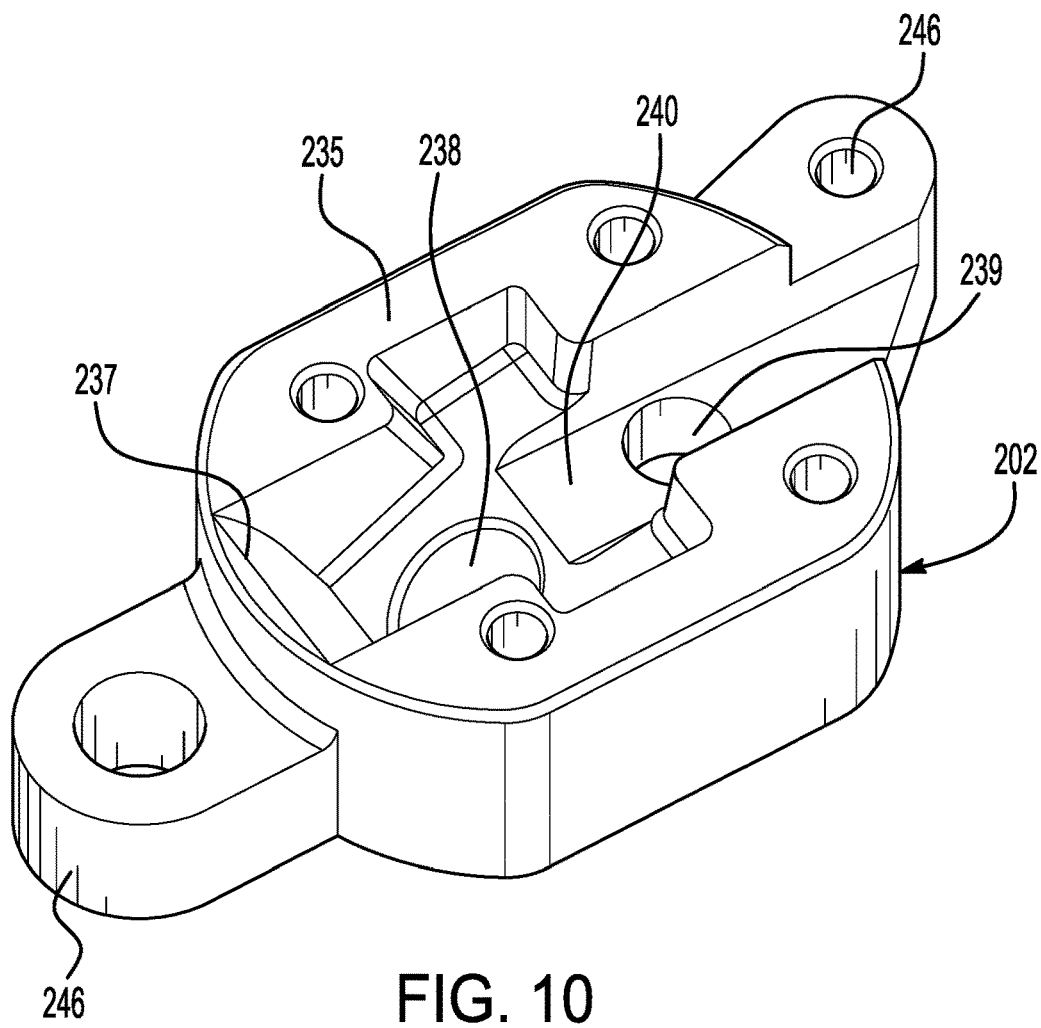
FIG. 10 illustrates a perspective view of the pocket plate of the electromechanical apparatus subassembly.

FIG. 10 illustrates a perspective view of the pocket plate 202. The pocket plate 202 is secured to a housing of the SSI via apertured attachment flanges 246 of the pocket plate 202 and apertured attachment flanges of the housing. Threaded fasteners of the solenoid of the SSI fasten the solenoid to the pocket plate 202. The pocket plate 202 has a coupling face 235 with a pocket 240 which defines a load bearing shoulder 237. The strut 204 is biased by an apply spring (not shown) disposed within a spring pocket 239 within the larger pocket 240 towards its engaged position. An actuator (e.g., a plunger) (not shown) of the SSI is extendable through an aperture 238 of the pocket plate 240 to extend into the pocket 240 and act on the strut 204.

Figure 11:
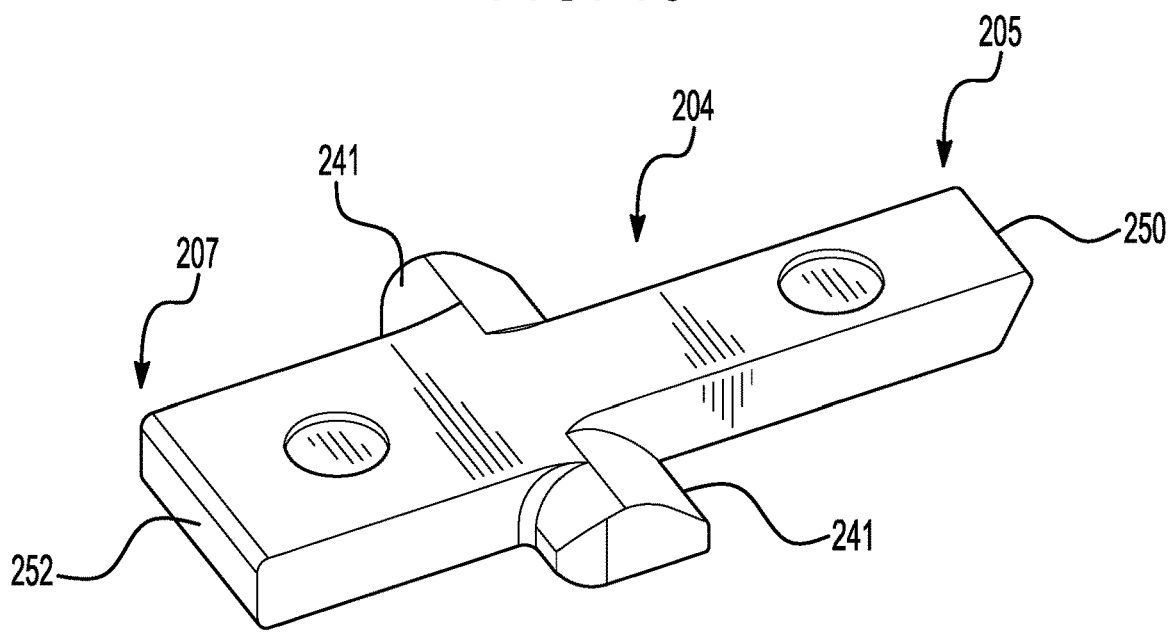
FIG. 11 illustrates a perspective view of the strut of the electromechanical apparatus subassembly.

FIG. 11 illustrates a perspective view of the strut 204. The strut 204 shown in FIG. 11 is a teeter-totter strut. The strut 204 includes a first engagement face 250, which is located at a front side 205 of the strut 204, and a second engagement face 252, which is located at a rear side 207 of the strut 204. In the engaged position, the first engagement face 250 extends out of the pocket 240. The strut 204 further includes a main body portion having a pair of ears 241. The strut 204 is pivotable about the ears 241 to pivot between the engaged and disengaged positions.

In accordance with embodiments of the present disclosure, a normally ON strut, such as the strut 204, which represents the reverse strut 52 of the SSI 14 of the radial/planar clutch system 10 and the strut 126 of the SSI 115 of the planar clutch system 111, has enhanced features for preventing unintended deployment of the strut due to shock load. That is, the enhanced features of the strut 204 prevent shock load from causing the strut to unintentionally move from the disengaged position ("OFF") to the engaged position ("ON").

More particularly, the strut 204 is continually acted on by an apply spring to be in the engaged position—hence, the strut 204 is a normally ON strut. The strut 204 in response to an actuator additionally acting on the strut pivots from the engaged position to the disengaged position. While the strut 204 is in the disengaged position due to the actuator additionally acting on the strut, the enhanced features of the strut prevent shock load from causing the strut to pivot from the disengaged position to the engaged position.

Referring now to FIGS. 12A, 12B, 12C, and 12D, cross-sectional views of the electromechanical apparatus subassembly 200 are shown. In addition to the pocket plate 202, the strut 204, and the cover plate 206, an apply spring 270 and a controllable plunger 272 of the electromechanical apparatus subassembly 200 are also shown therein.

In FIG. 12A, the strut 204 is in the engaged position due to biasing from the apply spring 270 whereby the strut is normally ON. The apply spring 270 acts on the "front" side of the strut 204 which is adjacent to the first engagement face 250 of the strut 204. Correspondingly, the plunger 272 is disengaged from the strut 204 and is not acting on or contacting the strut 204. As shown, in the engaged position, the first engagement face 250 of the strut 204 extends out of the pocket 240 of the pocket plate 202.

Figure 12B:
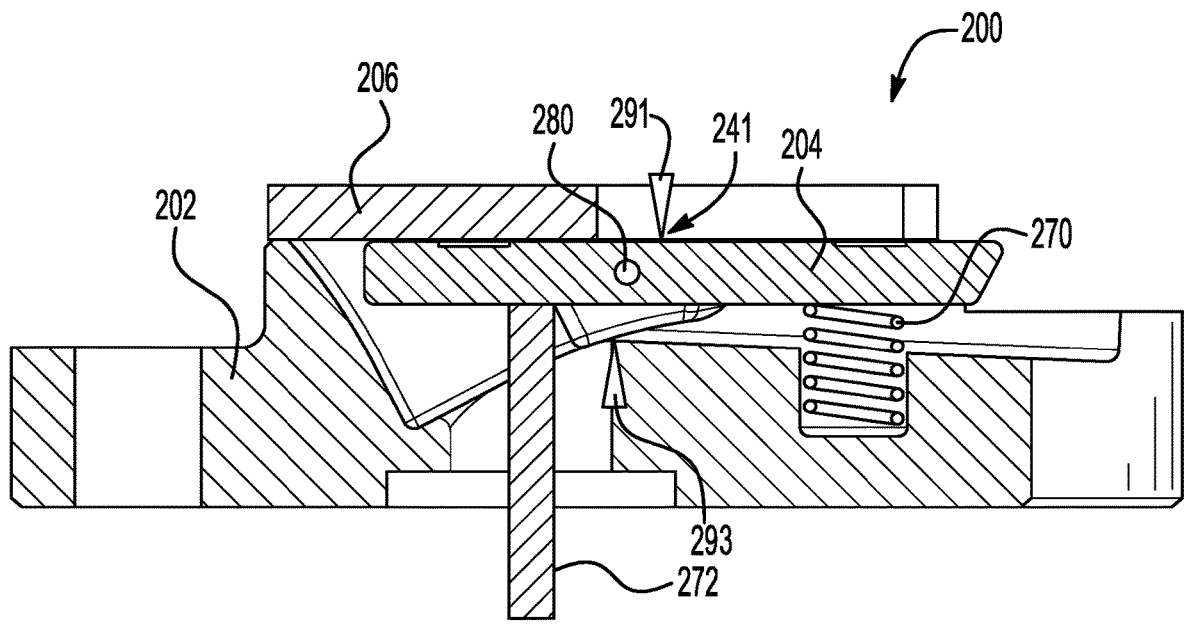
FIG. 12B illustrates a cross-sectional view of the electromechanical apparatus subassembly with the strut being in the disengaged position due to a plunger of the electromechanical apparatus subassembly additionally acting on the strut in a manner overcoming the biasing whereby the strut is controlled OFF.

In FIG. 12B, the strut 204 is in the disengaged position due to the plunger 272 additionally acting on the strut 204 in a manner overcoming the biasing provided by the apply spring 270 whereby the strut 204 is controlled OFF. The plunger 272 acts on the strut 204 by contacting the strut 204 and pushing upwards on the strut 204. Particularly, the plunger 272 acts on the "rear" side of the strut 204 which is adjacent to the second engagement face 252 of the strut 204. As shown, in the disengaged position, the strut 204 in its entirety, including the first engagement face 250 of the strut 204, lie within the pocket 240 and do not extend outward therefrom.

As shown in FIGS. 12A, 12B, 12C, and 12D, the enhanced features of the strut 204 include a center of mass (CoM) 280 being positioned to prevent unintended engagement of the strut 204 when the strut is in the controlled OFF position. The CoM 280 is positioned such that the strut 204 is biased toward the side of the strut 204 adjacent the plunger 272 relative to the ears 241 of the strut 204, but in front of a pivot in the mating member. Due to the positioning of the CoM 280 during an impact load parallel to the direction of engagement of the strut 204, the tendency for the strut 204 will be to move away from engagement. This prevents an additional G-load on an armature for the actuator from the strut 204.

Figure 12C:
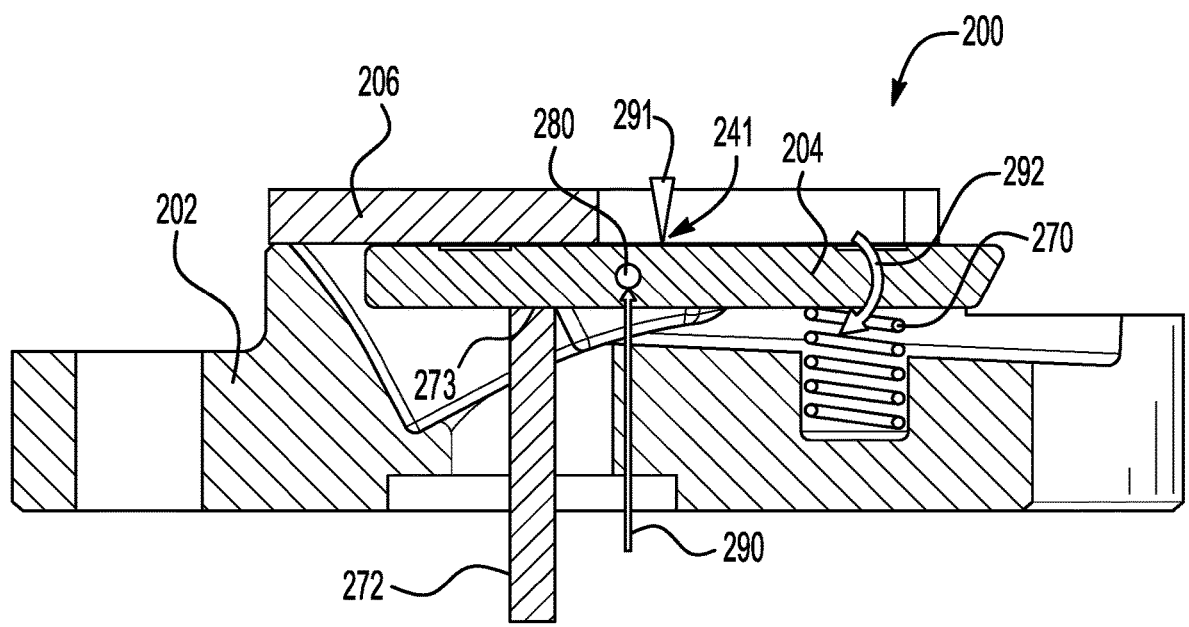
FIG. 12C illustrates a cross-sectional view of the electromechanical apparatus subassembly while the strut is in the disengaged position with upward shock load acting on the strut in which the enhanced features of the strut prevent the upward shock load from causing the strut to unintentionally deploy from the disengaged position to the engaged position.

In FIG. 12C, while the strut 204 is being held in the disengaged position by the plunger 272, an upward shock load 290 acts on the strut 204. As depicted in FIG. 12C, the upward shock load 290 is parallel to the engagement motion. The enhanced features of the strut 204 prevent the upward shock load 290 from causing the strut to unintentionally deploy from the disengaged position to the engaged position. Particularly, due to the positioning of the CoM 280 relative to a first or upward pivot point 291 of the strut 204 that acts on an upward or first side of the strut 204, moment 292 is negative, causing the strut to tip down and away from engagement. In particular, the CoM 280 is positioned or located between a point or section at which the plunger 272 acts on the strut 204 (indicated at 273), such as on a downward or second side as shown in FIG. 12C, and the first pivot point 291, which may be defined by the pair of ears 241 of the strut as shown in the illustrated embodiment. This motion prevents additional loads from the strut 204 from being induced on the plunger 272.

Figure 12D:
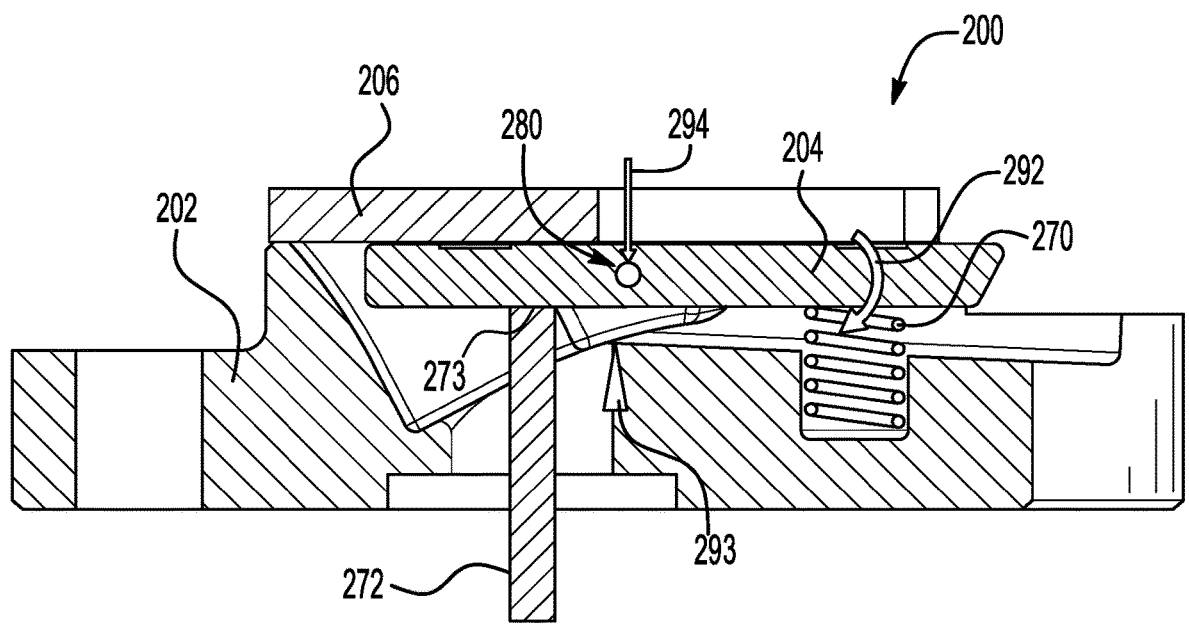
FIG. 12D illustrates a cross-sectional view of the electromechanical apparatus subassembly while the strut is in the disengaged position with downward shock load acting on the strut in which the enhanced features of the strut prevent the downward shock load from causing the strut to unintentionally deploy from the disengaged position to the engaged position.

In FIG. 12D, while the strut 204 is being held in the disengaged position by the plunger 272, a downward shock load 294 acts on the strut 204. As depicted in FIG. 12D, the downward shock load 294 is parallel to the engagement motion. The enhanced features of the strut 204 prevent the downward shock load 294 from causing the strut to unintentionally deploy from the disengaged position to the engaged position. Particularly, due to the positioning of the CoM 280 relative to a second or downward pivot point 293 of the strut 204 that acts on the downward side of the strut 204, moment 292 is negative, causing the strut to tip down and away from engagement. In particular, the CoM 280 is positioned or located so that the second pivot point 293 is positioned or located between the CoM 280 and a point or section at which the plunger 272 acts on the strut 204 (indicated at 273), such as on a downward side as shown in FIG. 12D. This motion prevents additional loads from the strut 204 from being induced on the plunger 272. The second pivot point 293 may be defined by a surface of the pocket plate 202 that is within the pocket 240 as shown in the illustrated embodiment. The CoM 280 of the strut 204 is located between the first pivot point 291 of the strut 204 and the second pivot point 293 of the strut 204.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

What is claimed is:

1. A clutch assembly comprising:
   a pocket plate having a pocket;
   a strut retained in the pocket and having a front side configured to extend out of the pocket, a rear side configured to engage a portion of the pocket, a first side, and a second side;
   an apply spring which continually acts on the strut for the strut to be in an engaged position; and
   an actuator,
   wherein the strut, in response to the actuator additionally acting on the strut, pivots from the engaged position to a disengaged position, and the clutch assembly is configured to prevent unintended deployment of the strut due to shock load so that, when the strut is in the disengaged position due to the actuator additionally acting on the strut, the clutch assembly prevents the shock load from causing the strut to pivot from the disengaged position to the engaged position, wherein the clutch assembly further comprises at least one of:
   i) a center of mass of the strut is located between a first pivot point of the strut and the rear side of the strut,
   ii) the center of mass of the strut is located between the first pivot point of the strut and a location on the second side of the strut at which the actuator acts on the strut and opposite the first side of the strut at which the first pivot point is located,
   iii) the first pivot point of the strut is located between the front side of the strut and the center of mass of the strut, or
   iv) a second pivot point of the strut is located between the center of mass of the strut and the location on the strut at which the actuator acts on the strut.

2. The clutch assembly of claim 1, wherein the first pivot point of the strut is defined by a pair of ears of the strut.

3. The clutch assembly of claim 1, wherein the engaged position is characterized by an engagement face of the strut extending out of the pocket.

4. The clutch assembly of claim 1, further comprising a selectable solenoid insert that includes the actuator.

5. The clutch assembly comprising:
   a pocket plate having a pocket;
   a strut retained in the pocket;
   an apply spring which continually acts on the strut for the strut to be in an engaged position; and
   an actuator,
   wherein the strut, in response to the actuator additionally acting on the strut, pivots from the engaged position to a disengaged position, and the clutch assembly is configured to prevent unintended deployment of the strut due to shock load so that, when the strut is in the disengaged position due to the actuator additionally acting on the strut, the clutch assembly prevents the shock load from causing the strut to pivot from the disengaged position to the engaged position,
   wherein a center of mass (CoM) of the strut is located between a first pivot point of the strut and a second pivot point of the strut.

6. The clutch assembly of claim 5, wherein the second pivot point of the strut is located between the CoM and a rear side of the strut.

7. The clutch assembly of claim 5, wherein the second pivot point of the strut is located between the CoM and a location at which the actuator acts on the strut.

8. The clutch assembly of claim 5, wherein the first pivot point acts on an upward side of the strut.

9. The clutch assembly of claim 8, wherein the second pivot point acts on a downward side of the strut.

10. A clutch assembly comprising:
    a pocket plate having a pocket;
    a strut retained in the pocket;
    an apply spring which continually acts on the strut for the strut to be in an engaged position; and
    an actuator including a plunger extending through the pocket plate into the pocket to engage a rear surface of the strut,
    wherein the strut, in response to the actuator additionally acting on the strut, pivots from the engaged position to a disengaged position, and the clutch assembly is configured to prevent unintended deployment of the strut due to shock load so that, when the strut is in the disengaged position due to the actuator additionally acting on the strut, the clutch assembly prevents the shock load from causing the strut to pivot from the disengaged position to the engaged position, wherein a pivot point of the strut is located between a center of mass (CoM) of the strut and a location on the strut at which the actuator acts on the strut.

11. The clutch assembly of claim 10, wherein the pivot point of the strut is defined by a surface of the pocket plate within the pocket of the pocket plate.

12. A clutch assembly comprising:
    a pocket plate having a pocket;
    a strut retained in the pocket and having a front side configured to extend out of the pocket, a rear side configured to engage a portion of the pocket, a first side, and a second side;
    an apply spring which continually acts on the strut for the strut to be in an engaged position; and
    an actuator,
    wherein the strut in response to the actuator additionally acting on the strut pivots from the engaged position to a disengaged position, and the clutch assembly further comprises at least one of the following:
    i) a pivot point of the strut that is located between the front side of the strut and a center of mass of the strut,
    ii) the center of mass of the strut is located between the first pivot point of the strut and the rear side of the strut,
    iii) the center of mass of the strut is located between the first pivot point of the strut and a location on the second side of the strut at which the actuator acts on the strut and opposite the first side of the strut at which the first pivot point is located, or
    iv) a second pivot point of the strut is located between the center of mass of the strut and the location on the strut at which the actuator acts on the strut,
    so that when the strut is in the disengaged position due to the actuator additionally acting on the strut, unintended shock load is prevented from causing the strut to pivot from the disengaged position to the engaged position.

13. The clutch assembly of claim 12, wherein the second pivot point acts on a downward side of the strut and is defined by a surface of the pocket plate that is within the pocket.

14. The clutch assembly of claim 12, wherein the strut is a teeter-totter strut.

15. The clutch assembly of claim 12, further comprising a selectable solenoid insert that includes the actuator.

16. A clutch assembly comprising:
    a pocket plate having a pocket;
    a strut retained in the pocket;

an apply spring which continually acts on the strut for the strut to be in an engaged position, and and actuator, wherein the strut in response to the actuator additionally acting on the strut pivots from the engaged position to a disengaged position, and the clutch assembly further comprises at least one of the following:
  (i) a fist pivot point of the strut that is located between a front side of the strut and a center of mass of the strut,
  ii) the center of mass of the strut is located between the first pivot point of the strut and a rear side of the strut,
  iii) the center of mass of the strut is located between the first pivot point of the strut and a location on the strut at which the actuator acts on the strut, or
  iv) a second pivot point of the strut is located between the center of mass of the strut and the location on the strut at which the actuator acts on the strut, so that when the strut is in the disengaged position due to the actuator additionally acting on the strut, unintended shock load is prevented from causing the strut to pivot from the disengaged position to the engaged position, wherein the first pivot points acts on an upward side of the strut and is defined by a pair of ears of the strut.

* * * * *